No. 796,826. PATENTED AUG. 8, 1905.
P. T. DODGE.
LOGOTYPE MACHINE.
APPLICATION FILED JAN. 19, 1905.
5 SHEETS—SHEET 1.
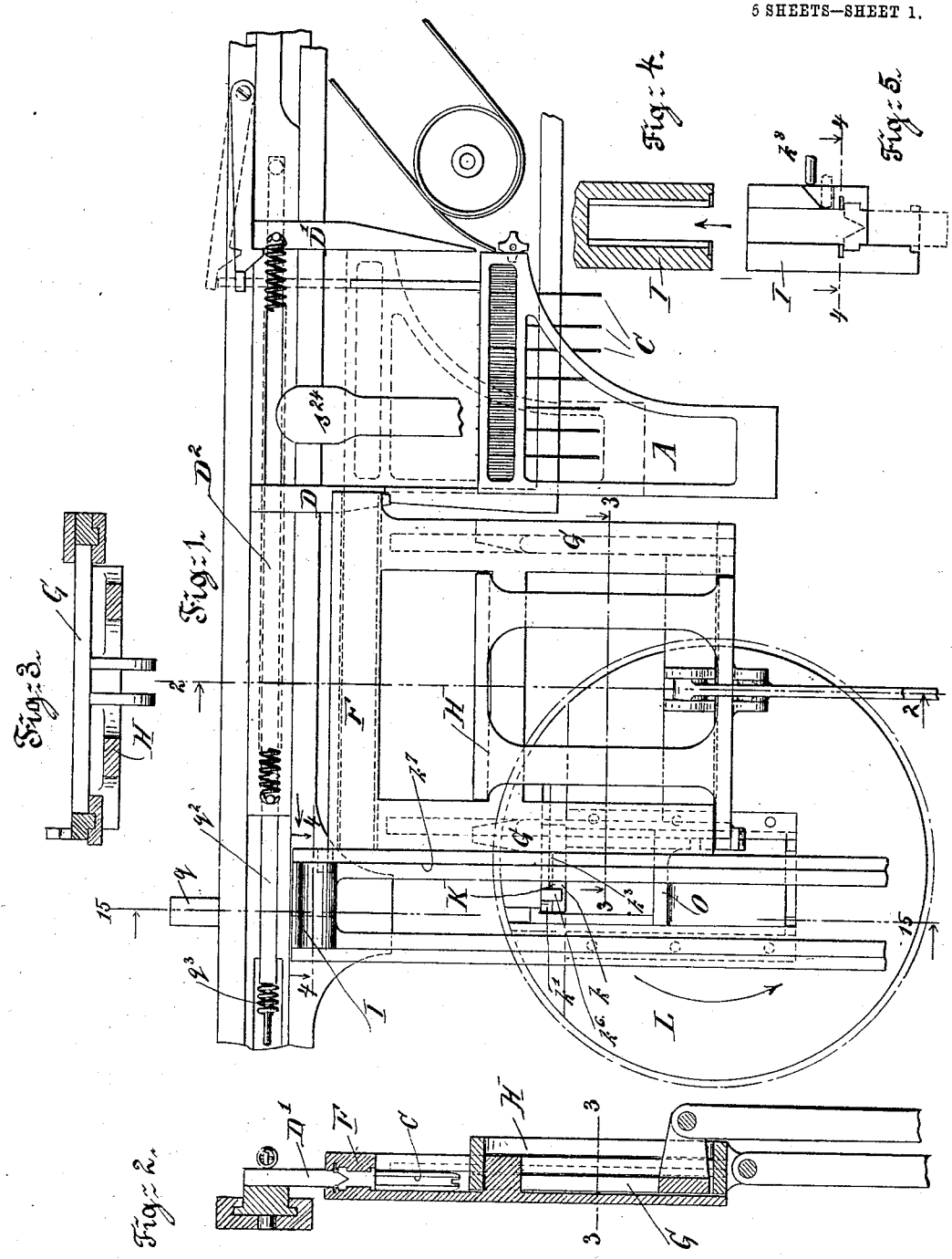
Witnesses
L. Petri-Palmed
A. M. E. Kennedy
Inventor
Philip T. Dodge

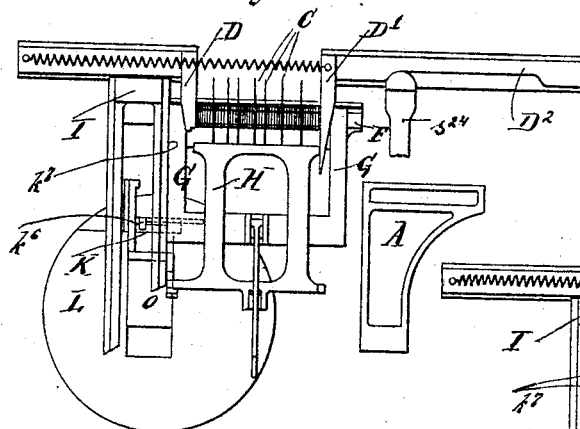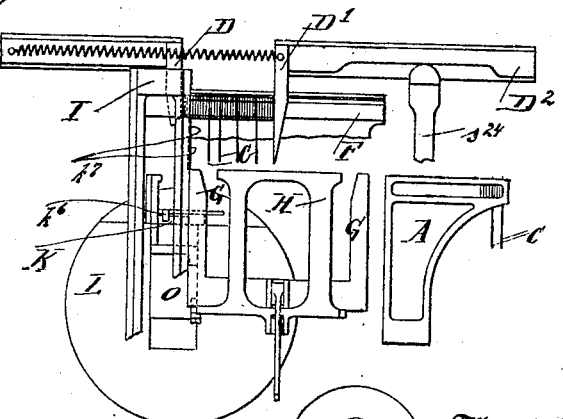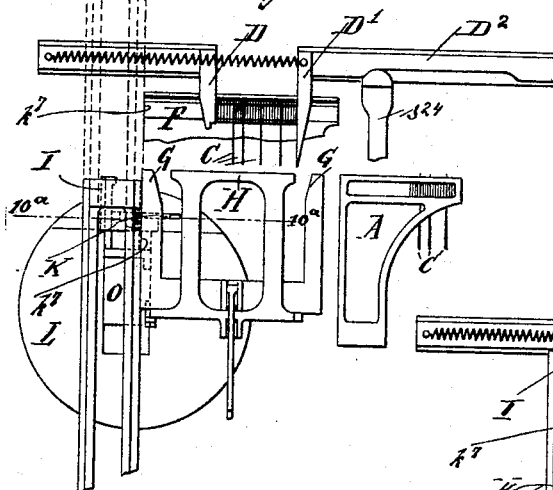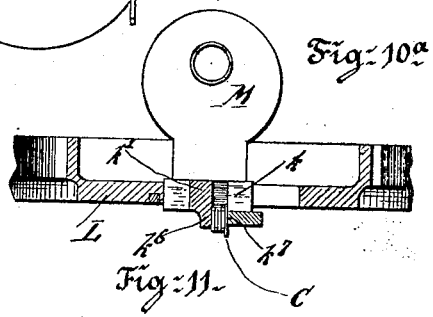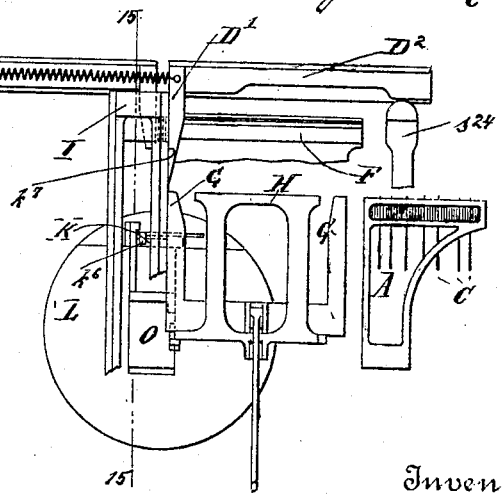

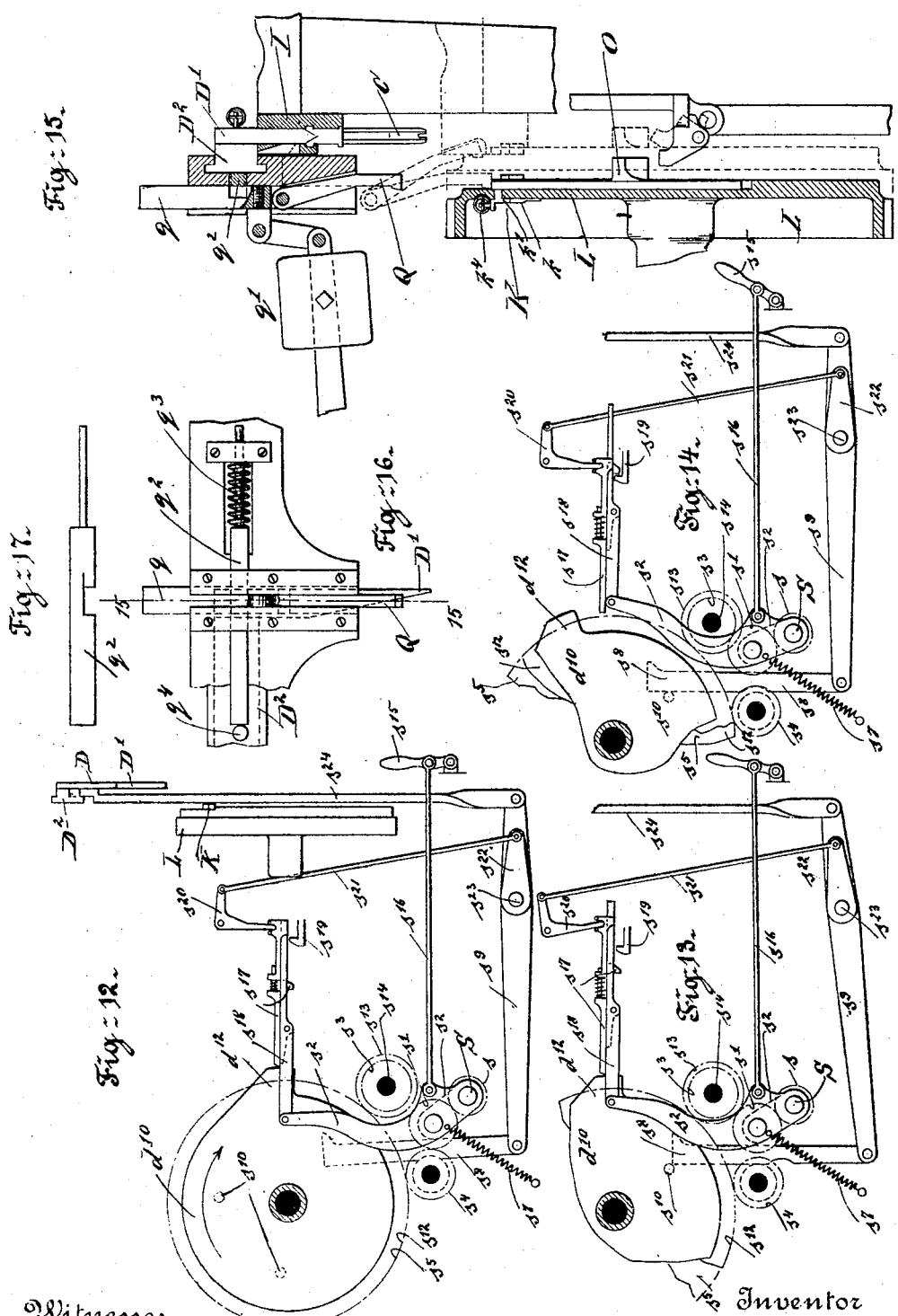
No. 796,826. PATENTED AUG. 8, 1905.
P. T. DODGE.
LOGOTYPE MACHINE.
APPLICATION FILED JAN. 19, 1905.
5 SHEETS—SHEET 4.
Witnesses
Inventor
Philip T. Dodge

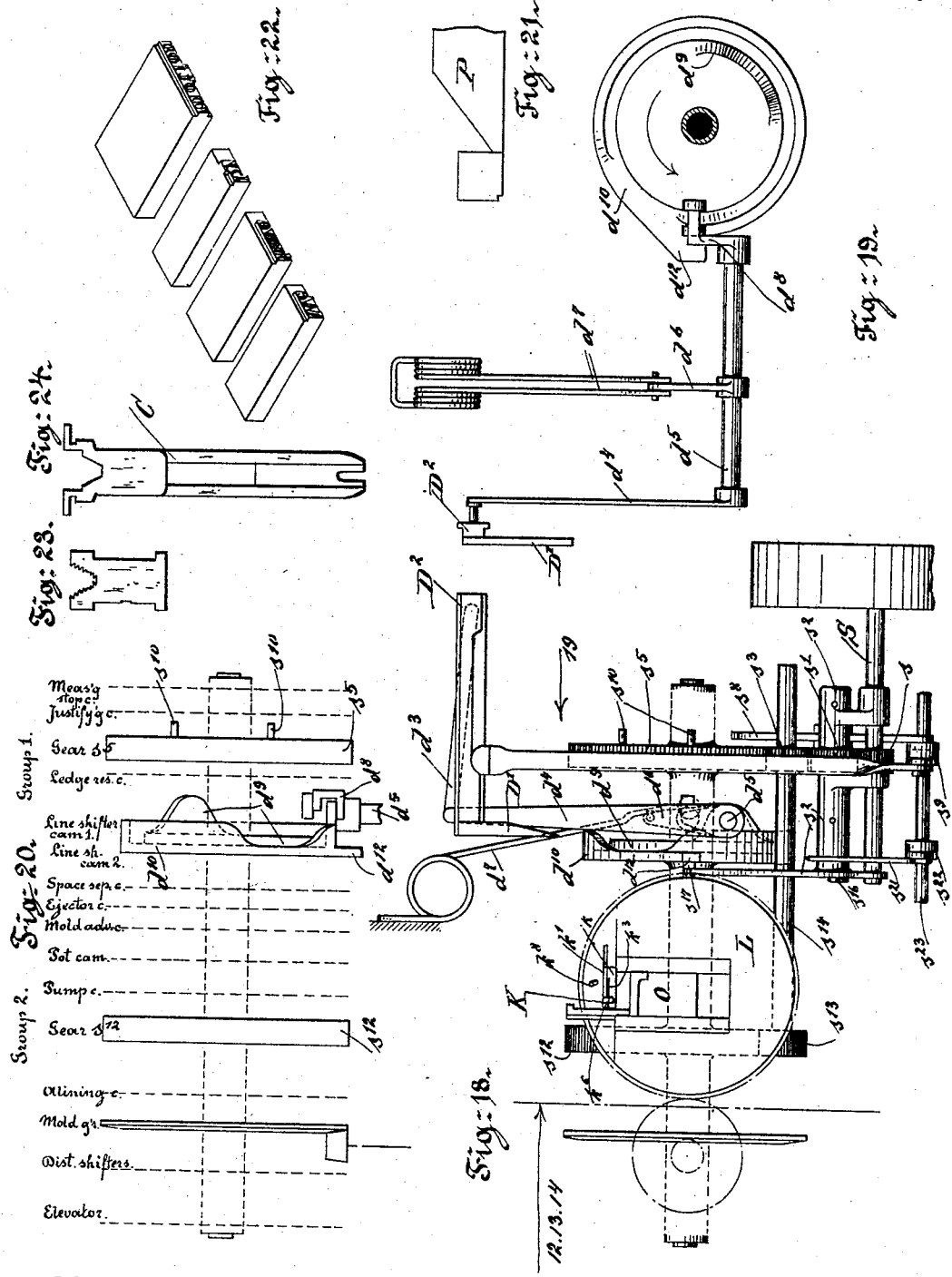

UNITED STATES PATENT OFFICE.

PHILIP T. DODGE, OF BROOKLYN, NEW YORK, ASSIGNOR TO MERGENTHALER LINOTYPE COMPANY, A CORPORATION OF NEW YORK.

LOGOTYPE-MACHINE.

No. 796,826.  Specification of Letters Patent.  Patented Aug. 8, 1905.

Application filed January 19, 1905. Serial No. 241,823.

*To all whom it may concern:*

Be it known that I, PHILIP T. DODGE, of Brooklyn, county of Kings, and State of New York, have invented a new and useful Improvement in Logotype-Machines, of which the following is a specification.

The aim of my invention is to produce a machine which will automatically cast in succession logotypes adapted when assembled to produce justified lines of uniform and predetermined length. To this end it relates to a modification of the commercial linotype-machine, such as represented in Letters Patent of the United States No. 557,000, whereby it is adapted after assembling the matrices and expansible spacers for a line of print and justifying the line, as usual, by means of the spacers to subdivide such line and transfer the groups of matrices representing words, together with an adjacent spacer, to a mold wherein the logotypes are formed one at a time, the length of the mold being controlled for each logotype by each group of matrices presented thereto in connection with the adjusted spacer.

I believe it to be broadly new to cast logotypes adapted to form justified lines of predetermined length from composed or assembled groups of matrices representing words in conjunction with spacers of widths determined in reference to the justification of the particular line in which the logotypes are to appear.

It is manifest that the details of the machine may be variously modified without changing, essentially, the mode of action or passing beyond the scope of my invention.

In the accompanying drawings I have represented my invention as embodied in a machine having the same general organization as the commercial Mergenthaler linotype of the present day, described as to its essential features in Letters Patent of the United States Nos. 436,532 and 557,000.

I have limited the drawings herein to my improved parts and those parts of the ordinary machine which are necessary to an understanding of my invention.

The main parts of the machine—such as the matrices, magazines, escapement devices, keyboard mechanism, assembling devices, the melting-pot and its adjuncts, and the distributing mechanism—may be of the ordinary or any suitable construction.

Figure 6:
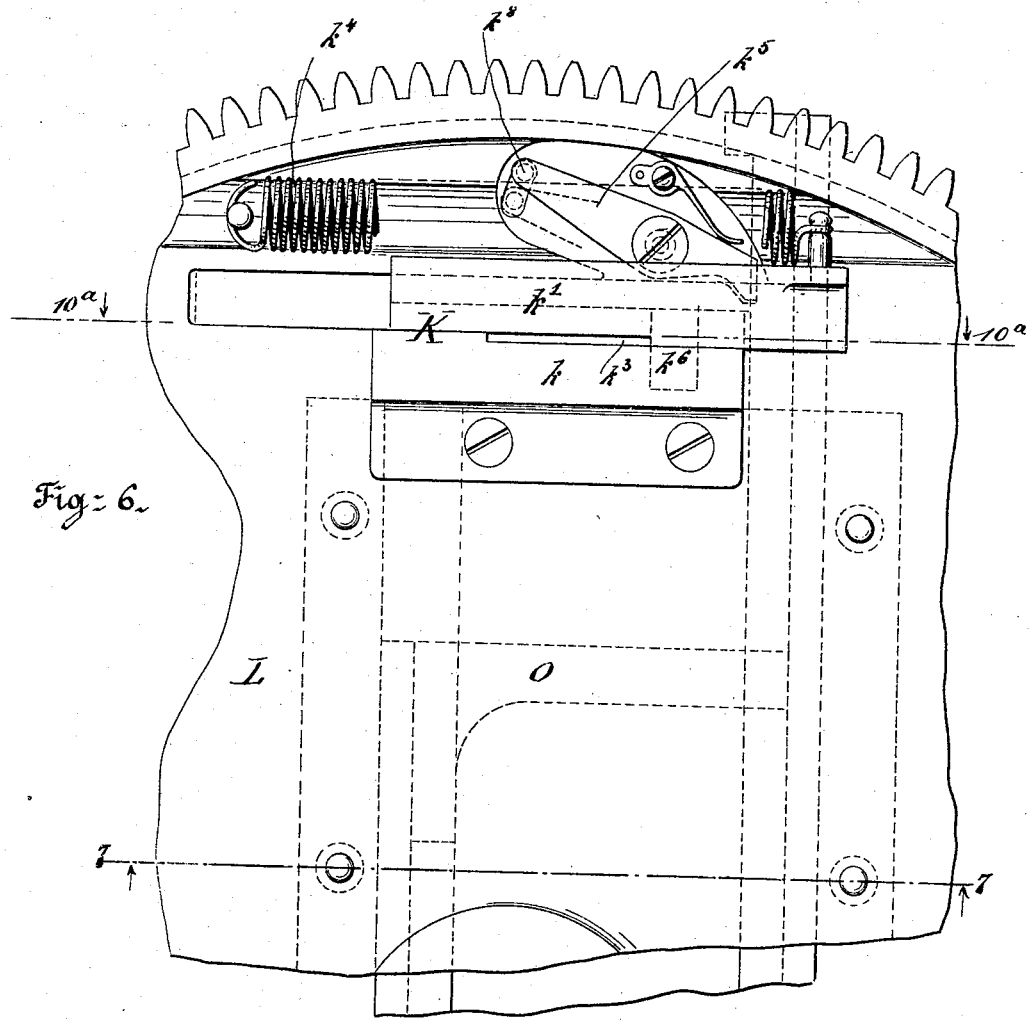
Figure 7:
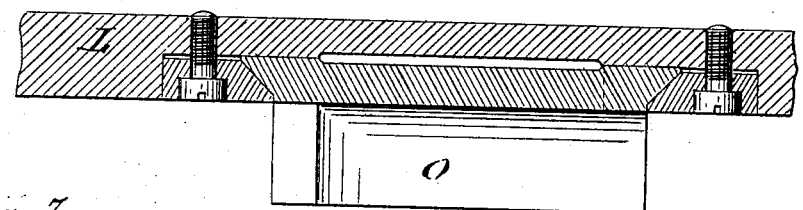

Referring to the drawings, Figure 1 is a front elevation showing the line assembling and transferring mechanisms, the casting mechanism, and adjacent parts. Fig. 2 is a vertical cross-section of the same on the line 2 2. Fig. 3 is a horizontal section on the line 3 3, Figs. 1 and 2. Fig. 4 is a horizontal section on the line 4 4 through the upper end of the elevator transferring the word groups and spacers to the mold and thence to the distributing devices. Fig. 5 is an end elevation of the same looking in the direction indicated by the arrows, Figs. 1 and 4. Fig. 6 is a rear elevation of the mold and adjacent parts. Fig. 7 is a cross-section on the line 7 7 of the preceding figure. Figs. 8, 9, 10, and 11 are front elevations showing in outline the assembling, transferring, and casting devices in their various stages of operation. Fig. $10^a$ is a horizontal section on line $10^a$ $10^a$, Figs. 6 and 10. Figs. 12, 13, and 14 are side elevations illustrating the mechanism for imparting movement to the transferring and casting devices, &c. Fig. 15 is a vertical section from front to rear on the line 15 15, Figs. 1, 11, and 16. Fig. 16 is a rear elevation of the parts shown in the upper portion of the preceding figure. Fig. 17 is a plan view of a controlling-slide shown in Figs. 15 and 16. Fig. 18 is a front elevation of the mold, a portion of the line-transferring mechanism, and the driving connections. Fig. 19 is a side elevation of parts shown in the preceding figure looking in the direction of the arrow 19. Fig. 20 is a diagram illustrating the groups of the various actuating cams, gears, &c. Fig. 21 is a plan view of the ejector-blade in operative position against one of the logotypes. Fig. 22 is a perspective view of a series of justifying-logotypes, the product of the machine. Figs. 23 and 24 are views, respectively, of a matrix and an expansible spacer forming permanent members of the machine.

I employ as the basic elements of my machine a series of circulating matrices and spacers, such as shown in Figs. 23 and 24, their construction being the same as that of those employed in the Mergenthaler linotype-machine. Each matrix has in one edge a character or matrix proper, and in the upper end a series of distributing-teeth. Each spacer is composed of two oppositely-tapered wedges connected by a sliding joint, one of the wedges being provided with ears, whereby it may be locked fast in the line, while its companion is driven upward endwise through the line in order to increase the thickness of the space at the operative point. The matrices and spacers, stored in their magazines as usual in the linotype-machine and released by finger-keys, are delivered successively by the usual devices into a channel in the upper part of the assembler A, as shown in Fig. 1. This assembler stands normally in the position shown, but may be raised by the operator to the position indicated by dotted lines in order to deliver the matrices between the depending fingers D D' of a horizontal movable carriage $D^2$. The movement of this carriage transfers the line from the assembler into the stationary supporting-channel F, known as the "intermediate" channel. Up to this point the parts have essentially the same construction and mode of operation as in the linotype-machine, except that the line instead of being transferred directly through the channel F to the elevator beyond is in the present machine arrested in the intermediate channel, as shown in Fig. 8. While the composed line is seated in the channel F, the slide G rises so that the line-carrying fingers D and D' are confined between the arms, which are separated a distance equal to the length of the required line. H represents a second vertical slide located beneath the position occupied by the line for the purpose of acting upon the spacers C to push them upward through the line, as shown in Fig. 8, thereby elongating or justifying the line to the predetermined length. The length is limited by the fingers D D', which are in turn confined by the arms G.

I represents a vertically-movable elevator to which the forward end of the composed line is repeatedly advanced in order that the word groups of matrices and the spacer behind each group may be removed from the front of the line and carried downward to the mold. This elevator is formed with a vertical slot extending inward from one end, as shown in horizontal section in Fig. 4 and in end elevation in Fig. 5. The body of the slot is of suitable size and form to admit the matrices. The upper ends of the spacers are wider than the matrices, and the outer end of the slot in the elevator is widened to correspond, as shown in Fig. 4, so that the one spacer will follow the word group of matrices into the elevator and be arrested in the end of the same, as indicated by dotted lines in Fig. 5.

The mold K is mounted, as in the linotype-machine, in a vertical intermittingly-rotated disk L, whereby it is presented alternately at the casting and ejecting positions. The mold consists of a stationary lower member $k$ and an upper member $k'$, mounted to slide lengthwise thereon, their opposing surfaces being formed to leave an intermediate slot or mold proper, $k^3$, the ends of which are formed by shoulders on the respective parts, so that by sliding the upper member endwise the length of the slot may be increased or diminished according to the width of the logotype to be produced. A spring $k^4$, extending from the supporting-wheel to the movable end of the mold, tends constantly to close the same or reduce its length, and a latch $k^5$, engaging the movable member, as shown in Fig. 6, serves to hold the same open or, in other words, to maintain a slot of maximum length until a group of matrices is presented to the mold. The sliding member of the mold is provided, as shown in Figs. 6 and $10^a$, with a forwardly-projecting jaw $k^6$ to confine the group of matrices on one side, while the main frame is provided with a vertical surface $k^7$, Fig. $10^a$, &c., to support the line on the opposite side.

When the composed line is advanced from the justifying position toward the elevator I, the forward group of matrices representing the first word, together with the following spacer, are carried into the elevator, as shown in Fig. 9, after which the elevator descends until the matrices and the spacer are presented in front of the mold, the spacer traveling downward along the vertical surface $k^7$, before alluded to, on the frame. As the elevator completes its descent its upper end acts upon a trip-pin $k^8$ (see Figs. 5, 6, and 18) on the latch $k^5$ and causes the latter to disengage the upper part of the mold, which immediately closes to the right in order to clamp the matrix-line between it and the surface of the main frame, as shown in Fig. $10^a$. In this manner the mold is automatically adjusted to a length corresponding to the length of the matrix-line plus the thickness of the adjacent spacer C. The mold will communicate on the back, as usual in linotype and analogous machines, with the melting-pot M, as indicated in Fig. $10^a$, containing the usual delivery-plunger, having a mouth adapted to close the back of the mold, into which the molten metal will be delivered against the matrices and the spacer. After the casting operation the elevator I will lift the composed line to and above its original position to devices for distributing it, as in the ordinary linotype-machine, after which the remaining portion of the composed line which has been withdrawn in the meantime will be again advanced to the elevator and the next word group of matrices and the spacer presented to the casting devices, and so on repeatedly. In this manner logotypes representing successive words, and the adjacent spacer, will be cast from the successive groups in the one mold. The last group, representing the final word in the line, will be without a spacer, since no space is to appear on the last logotype.

In order that the logotypes produced from the original composed line may have spaces of suitable width—that is to say, spaces which will cause the line to justify when the logotypes are assembled—it is necessary that each spacer on presentation to the mold shall stand in the same position with reference to the line, or, in other words, shall present the same space in the line that it did when the matrix-line was originally justified in the intermediate channel. For this purpose I propose to employ any suitable mechanism to be set or adjusted automatically during the original justification of the line and to serve further to insure the corresponding adjustment of the spacers at the mold. In the form shown the device consists of a slide O, mounted on the mold-wheel L, its upper end standing in position to act upon the spacer in front of the mold and its right side being adapted to engage with the slide H, by which the spacers are adjusted in the first instance. When, therefore, the slide H is raised to a greater or less height to effect the original justification of the line, it will set the slide O at a corresponding height. The parts are fitted with such friction that the slide will retain the position in which it is set, so that when the successive groups of matrices and spacers are lowered to the mold by the elevator I the lower end of the spacer will encounter the top of the slide O, by which the spacer will be held or raised to the position it occupied at the time of the original justification. After each casting operation the pot and the mold-wheel are moved rearward away from the matrices, as in the linotype-machine, and the wheel given a partial rotation in order to bring the mold and the contained logotype opposite an ejector-blade, as in the linotype-machine. I prefer to make this ejector-blade P, as shown in Fig. 21, with its forward edge beveled on one side, so that it may act against the mold and force the same open until it is locked by the latch, as previously described. These details are not of the substance of my invention and may be modified at the will of the constructor. After the casting operation it is necessary that the spacer-adjusting slide O should be depressed to its original position. This may be effected in any suitable manner. For example, as shown in Fig. 15, by a finger Q, pivoted to a vertical slide $q$ in the main frame, this slide being urged downward by a weight $q'$ and sustained by a horizontally-sliding latch $q^2$, Figs. 15, 16, and 17. This latch is urged into engagement by a spring $q^3$ and is tripped out of engagement by a pin $q^4$ on one end of the transfer-carriage $D^2$ when the latter returns to its normal position.

In order to impart the proper relative movements to the parts above described, I may employ driving mechanism of any suitable construction.

I have represented in Figs. 12 to 21 suitable mechanism for imparting those movements which are peculiar to the present machine, this mechanism being essentially the same as that shown in my pending application, Serial No. 234,069.

It will be remembered that the line-carriage $D^2$ after receiving the composed line advances from its normal position first to an intermediate position in the channel F, where the line is justified, and thereafter the carriage advances to the left repeatedly, presenting each word group of matrices in its order to the elevator I, and then retreating slowly to the right. In order to impart movement to the carriage, I connect the same, as shown in Figs. 18 and 19, by link $d^3$ and lever $d^4$ with rock-shaft $d^5$, having a crank-arm $d^6$, acted upon by a spring $d^7$, which tends through the intermediate parts to move the line-carriage forward toward the left in order to present the line to elevator I. The rock-shaft $d^5$ is also provided with a second crank-arm $d^8$, acted upon by two independently-turning concentric cams $d^9$ and $d^{10}$, which serve to control the repeated advances of the carriage and line and to effect their retraction. They receive motion from the continuously-driven main shaft S in the manner shown in Figs. 12 to 14 and Fig. 18, carrying a pinion $s$, which constantly engages the idler $s'$, carried by a supporting arm or frame $s^2$, turning around the shaft S as a center. The vibratory motion of the support $s^2$ serves to throw the continuously-running idler $s'$ into engagement with a pinion $s^3$ or pinion $s^4$. The pinion $s^4$, which receives motion intermittingly from the idler $s'$, engages a gear-wheel $s^5$, secured on the tubular shaft of the smaller cam $d^9$. A spring $s^7$, acting upon arm $s^2$, tends to throw the idler $s'$ into engagement, and thereby cause the rotation of the cam $d^9$; but it is thrown out of engagement and kept out for suitable intervals by means of a vertical bar $s^8$, passing downward between the hubs of the pinions $s'$ and $s^4$ and notched on one side. This bar is pivoted at its lower end to a lever $s^9$, and its upper end is arranged in the path of studs $s^{10}$ on the cam-turning gear $s^5$, as shown, so that when the line-carriage reaches the proper point in its forward travel the stud $s^{10}$ will drive the bar $s^8$ downward from the position shown in Fig. 13, causing it to throw the pinion $s'$ out of action. The second carriage-controlling cam $d^{10}$ has its tubular shaft provided (see Fig. 18) with a gear-wheel $s^{12}$, which receives motion from pinion $s^{13}$ on shaft $s^{14}$, which carries the pinion $s^3$, before alluded to, so that when the idler $s'$ is thrown into engagement with the pinion $s^3$, as shown in Fig. 14, the cam $d^{10}$ is set in motion, its companion $d^9$ remaining at rest. The movement of the arm $s^2$ to throw the pinion $s^3$ into action and turn the cam $d^{10}$ is effected by the hand-lever $s^{15}$, connected with the arm by link $s^{16}$. The connection of the pinion is maintained by a pivoted latch $s^{17}$, carried by an arm $s^{18}$ and arranged to engage a fixed lip $s^{19}$ on the frame. When the machine has completed its cycle of operations and cam $d^{10}$ has completed its revolution, a projection $d^{12}$ thereon acts on the end of the latch $s^{17}$ and trips the same out of engagement, permitting the arm $s^2$ to move and uncouple the pinions. The latch $s^{17}$ is moved endwise into the path of the projection $d^{12}$ by an angular lever $s^{20}$, connected by rod $s^{21}$ to an arm $s^{22}$ on the shaft $s^{23}$ of the lever $s^9$, before referred to. The rear end of the lever $s^9$ is provided with an uprising arm $s^{24}$, the upper end of which, as shown in Figs. 1, 8, 9, &c., and Fig. 18, stands in the path of the transfer-carriage $D^2$, which has at its ends inclined or cam surfaces to act upon and depress the arm $s^{24}$. The effect of this depression is to operate the lever $s^9$ and throw the tripping-dog $s^{17}$ into the path of shaft $d^9$, while at the same time the pinion-controlling bar $s^8$ is raised.

Through the parts above described the final retraction of the line-carriage sets the parts in the position shown in Fig. 13, so that the idler is out of engagement and both sets of cams at rest. As the transfer-carriage completes its forward movement the first set of cams, including cam $d^9$, are set in action.

The various cams and other connections for rotating the mold, for sliding the same to and from the matrix-line, and for actuating the pot and ejector are foreign to the present invention and may be, generally speaking, of the same construction and arrangement as in the linotype-machine.

The leading features of my invention, which may be embodied in devices of various forms the equivalents of those herein shown, are the presentation to a variable mold of word groups of matrices in connection with spacers adjusted to form on the logotypes produced in the mold spaces of a width necessary to justify the particular lines in which the logotypes are to appear, the position of a line of matrices and spacers, the adjustment of the spacers therein to effect justification, and the utilization of the adjusted spacers to secure their like adjustment when presented to the mold in connection with the matrices.

I believe myself to be the first to organize in any manner a machine in which a justified line of matrices and spacers is subdivided and the word groups of matrices presented to the mold in connection with the adjacent spacers in order to secure the formation on each logotype of a space suitable to effect justification when the series of logotypes are assembled in line. I believe myself also to be the first to present to a logotype-mold successive word groups of matrices in connection with spaces of predetermined width to cause the formation of justifying-spaces on the ends of the logotypes.

The word "spacer" is used herein to designate an expansible spacing device—such, for example, as the familiar Schuckers' spacer, consisting of oppositely-tapered wedges. By the employment of expanding spacers as a means of separating the word groups of matrices I am enabled to avoid the necessity of employing a separate justifying mechanism to effect the proper adjustment of the mold, as would be required if non-expanding spaces were used between the word groups. By carrying the spacers in their adjustable or justifying positions with the word groups to the mold I am enabled not only to effect the automatic adjustment of the mold and produce a space of proper length on the logotype, but also to dispose of or distribute the spacers at the same time that the matrices are distributed by the ordinary simple mechanism of the linotype-machine.

Having described my invention, what I claim is—

1. In a logotype-machine, matrices, spacers, means for assembling them in line and adjusting the spacers to justify the line, in combination with a variable mold and means for presenting thereto in succession the word groups of matrices, together with the adjoining spacers in their justifying positions, to produce logotypes with justifying-spaces thereon.

2. In a logotype-machine, the combination of a variable mold, the composed justified line of matrices and spacers, means for dividing said line and presenting the word groups of matrices, with the adjacent spacers, successively to the mold, and means for insuring at the mold the same adjustment of the spacers that they had in the original line, whereby the production of logotypes with attached spaces suitable for justification of the line, is secured.

3. In a logotype-machine, matrices, expanding spacers, means for sustaining them in a composed line, and means for adjusting the spacers to justify the line, in combination with a mold variable in length, means for dividing the composed line and presenting the word groups of matrices and the adjacent spacers to the mold, and means controlled by the justifying devices to give the spacers at the mold the same width they had in the justified line.

4. In a logotype-machine, the combination of a composed line of matrices and expanding spacers, means for limiting the length of the line, means for adjusting the spacers to justify the line, a variable mold, means for transferring the word groups of matrices and the adjacent spacers to the mold, and means controlled by the spacer-adjusting devices to control the adjustment of the spacers at the mold.

5. In a logotype-machine, the combination of matrices and expansible spacers, with means for adjusting the spacers to justify the line, an elevator adapted to receive the word groups of matrices and adjacent spacers, a reciprocating carrier adapted to present the successive groups to the elevator, a variable mold to which the groups are presented, and an adjustable device adjacent to the mold to control the adjustment of the spacers.

6. The mold, having a sliding member to vary its length, and a jaw carried thereby to confine the matrices, in combination with an opposing stationary support for the matrices, means for presenting the matrices, and a sliding member, O, to determine the adjustment of the spacers in front of the mold.

7. In a logotype-machine, a rotary disk, L, having the adjustable mold and the adjacent slide, O, mounted thereon.

8. A series of matrices and expansible spacers, in combination with a variable mold, an elevator for transferring the matrix groups to the mold, a pusher, H, to adjust the spacers in the original line, and a spacer-stop, O, located adjacent to the mold and arranged to be adjusted by the pusher H.

9. In a logotype-machine, the combination of matrices and spacers, means for sustaining them in line, a transfer-carriage having fingers D, D', to embrace the line, means for advancing and retracting the carriage repeatedly to deliver successive word groups and adjacent spacers, a transfer mechanism receiving the groups from said carriage, a variable mold which receives the matrices and spacers, and means for controlling the adjustment of the spacers at the mold to produce spaces of the required width on the logotypes cast in said mold.

In testimony whereof I hereunto set my hand, this 14th day of January, 1905, in the presence of two attesting witnesses.

PHILIP T. DODGE.

Witnesses:
JOHN F. GEORGE,
K. L. BRENNAN.